(12) United States Patent
Kim et al.

(10) Patent No.: US 12,512,152 B2
(45) Date of Patent: Dec. 30, 2025

(54) RANDOM ACCESS MEMORY AND METHOD OF FABRICATING THE SAME

(71) Applicant: SEOUL NATIONAL UNIVERSITY R&DB FOUNDATION, Seoul (KR)

(72) Inventors: Jae-Joon Kim, Seoul (KR); Munhyeon Kim, Seoul (KR)

(73) Assignee: Seoul National University R&DB Foundation, Seoul (KR)

( * ) Notice: Subject to any disclaimer, the term of this patent is extended or adjusted under 35 U.S.C. 154(b) by 94 days.

(21) Appl. No.: 18/635,268

(22) Filed: Apr. 15, 2024

(65) Prior Publication Data

US 2024/0347105 A1 Oct. 17, 2024

(30) Foreign Application Priority Data

Apr. 14, 2023 (KR) .................... 10-2023-0049289

(51) Int. Cl.
  *G11C 7/00* (2006.01)
  *G11C 5/06* (2006.01)
  (Continued)

(52) U.S. Cl.
  CPC ............ *G11C 11/419* (2013.01); *G11C 5/063* (2013.01); *H10B 10/125* (2023.02);
  (Continued)

(58) Field of Classification Search
  CPC ..... G11C 11/419; G11C 5/063; H10B 10/125; H10D 30/014; H10D 30/6757;
  (Continued)

(56) References Cited

U.S. PATENT DOCUMENTS 6,268,240 B1 * 7/2001 Hayashi ................. H10B 10/00
                                                            438/210
6,366,493 B1 * 4/2002 Hsiao ..................... G11C 11/412
                                                          257/E27.098
(Continued)

FOREIGN PATENT DOCUMENTS

EP       0642134 A2 *  3/1995  ....... G11C 29/50016
JP    2003224211 A  *  8/2003  .......... H01L 27/1104
(Continued)

OTHER PUBLICATIONS

Liu "Imec Demonstrates Capacitor-less IGZO-Based DRAM Cell With >400s Retention Time" https://www.imec-int.com/en/press/imec-demonstrates-capacitor-less-igzo-based-dram-cell-400s-retention-time, Dec. 15, 2020 (pp. 1-8).

*Primary Examiner* — Viet Q Nguyen
(74) *Attorney, Agent, or Firm* — NSIP Law

(57) ABSTRACT

A random access memory includes a first transistor including a first gate extending in a first direction, a second transistor disposed on a same plane as the first transistor and including a second gate extending in the first direction, a third transistor including a third gate extending in a second direction perpendicular to the first direction and formed on the first transistor, a fourth transistor including a fourth gate extending in the second direction and formed on the second transistor, a first storage node connecting the first gate of the first transistor to a drain of the third transistor and storing data, and a second storage node connecting the second gate of the second transistor to a drain of the fourth transistor and storing data.

13 Claims, 10 Drawing Sheets

(51) Int. Cl.
  *G11C 11/419* (2006.01)
  *H10B 10/00* (2023.01)
  *H10D 30/01* (2025.01)
  *H10D 30/43* (2025.01)
  *H10D 30/67* (2025.01)
  *H10D 62/10* (2025.01)

(52) U.S. Cl.
  CPC ........... *H10D 30/014* (2025.01); *H10D 30/43* (2025.01); *H10D 30/6729* (2025.01); *H10D 30/6735* (2025.01); *H10D 30/6757* (2025.01); *H10D 62/121* (2025.01)

(58) Field of Classification Search
  CPC .. H10D 62/121; H10D 30/6735; H10D 30/43; H10D 30/6729
  USPC .................................................. 365/189.011
  See application file for complete search history.

(56) References Cited

U.S. PATENT DOCUMENTS

| | | | | |
|---|---|---|---|---|
| 6,646,310 | B2* | 11/2003 | Hsiao | H10B 10/00 257/E27.098 |
| 6,724,650 | B2* | 4/2004 | Andoh | G11C 11/412 365/156 |
| 6,920,061 | B2* | 7/2005 | Bhavnagarwala | G11C 11/412 365/185.24 |
| 7,355,906 | B2* | 4/2008 | Joshi | G11C 7/02 365/189.11 |
| 7,492,625 | B2* | 2/2009 | Joo | G11C 11/412 365/189.05 |
| 8,213,219 | B2* | 7/2012 | Cho | G11C 11/412 365/156 |
| 9,698,047 | B2* | 7/2017 | Hung | H10D 30/6211 |
| 10,916,296 | B2* | 2/2021 | Zhou | G11C 8/16 |
| 11,749,059 | B2* | 9/2023 | Steelman | G06Q 20/3278 463/25 |
| 12,225,702 | B2* | 2/2025 | Lee | H10B 10/12 |
| 2008/0094879 | A1* | 4/2008 | Masuo | G11C 11/419 365/156 |

FOREIGN PATENT DOCUMENTS

| | | |
|---|---|---|
| KR | 10-2021-0096678 A | 8/2021 |
| KR | 10-2022-0044634 A | 4/2022 |

* cited by examiner

Random access memory (10)

RANDOM ACCESS MEMORY AND METHOD OF FABRICATING THE SAME

CROSS REFERENCE TO RELATED APPLICATIONS

This application claims the benefit under 35 USC 119 (a) of Korean Patent Application No. 10-2023-0049289, filed with the Korean Intellectual Property Office on Apr. 14, 2023, the disclosure of which is incorporated herein by reference in its entirety.

FIELD OF THE INVENTION

The present disclosure relates to a random access memory and a method of manufacturing the random access memory.

BACKGROUND

Conventional semiconductor memory devices are divided into static random access memory (SRAM) which is used as cache memory and dynamic random access memory (DRAM) which is used as a main memory. SRAM is used for a high-speed operation, but one memory cell generally includes at least six transistors and has low integration, and accordingly, there is a problem in that an area increases when implementing a high-capacity memory. In general, DRAM has a 1T1C cell structure in which one memory cell includes one transistor and one capacitor, and may be implemented in high-capacity and high integration but has a slower operation speed and shorter retention time than SRAM, and accordingly, there is a problem in that DRAM requires refresh at regular intervals even during operations other than read/write operations.

The present disclosure proposes a random access memory having a new structure that may replace SRAM and DRAM. That is, the present disclosure proposes a random access memory that may achieve high integration with a smaller number of elements compared to SRAM and increase data retention time compared to DRAM.

In particular, it is known that at least 6T structure is required when using the conventional memory cells in the application of binary neural network (BNN) based on an XNOR operation, and binary content addressable memory (BCAM), which is a type of a content addressable memory (CAM), requires a 10T structure and ternary CAM (TCAM) requires a 16T structure. The present disclosure proposes a new paired orthogonally stacked transistor for random access memory (OST-RAM).

PATENT PRIOR ART

An example of related art includes Patent Document 1 (Korean Patent Publication No. 10-2021-0096678 (Title of the invention: MEMORY DEVICE HAVING SHARED READ/WRITE DATA LINE FOR 2-TRANSISTOR VERTICAL MEMORY CELL)).

CONTENTS OF THE DISCLOSURE

The Problem Trying to Solve

The present disclosure provides a random access memory having a new structure in which two pairs of transistors are vertically stacked, and a method of manufacturing the random access memory.

However, technical objects to be achieved by the present embodiments are not limited to the technical objects described above, and there may be other technical objects.

Means of Solving the Problem

According to a first aspect of the present disclosure, a random access memory includes a first transistor including a first gate extending in a first direction, a second transistor disposed on a same plane as the first transistor and including a second gate extending in the first direction, a third transistor including a third gate extending in a second direction perpendicular to the first direction and formed on the first transistor, a fourth transistor including a fourth gate extending in the second direction and formed on the second transistor, a first storage node connecting the first gate of the first transistor to a drain of the third transistor and storing data, and a second storage node connecting the second gate of the second transistor to a drain of the fourth transistor and storing data.

According to a second aspect of the present disclosure, a method of fabricating a random access memory includes forming, on a same plane, a first transistor including a first gate extending in a first direction and a second transistor including a second gate extending in the first direction, forming an interlayer separation layer on the first transistor and the second transistor, and forming, on the interlayer separation layer, a third transistor including a third gate extending in a second direction perpendicular to the first direction and forming a fourth transistor including a fourth gate extending in the second direction, in which the third transistor and the fourth transistor are formed on a same plane, wherein throughout the forming of the first transistor and the second transistor and the forming of the third transistor and the fourth transistor includes forming a first storage node connecting the first gate of the first transistor to a drain of the third transistor, and a second storage node connecting the second gate of the second transistor.

Effects of the Invention

A configuration of the present disclosure includes a structure in which two transistors stacked perpendicularly are orthogonal to each other, and lengths of gates of respective transistors may be designed to be different from each other. Also, because a read transistor and a write transistor are in different layers, memory data may be freely arranged. Also, according to the present disclosure, compared to the DRAM having a conventional structure, an operation speed is further increased, retention time increases, and thus, an energy-efficient and high-speed operation may be performed.

DETAILED DESCRIPTION OF THE EMBODIMENTS

Figure 1:
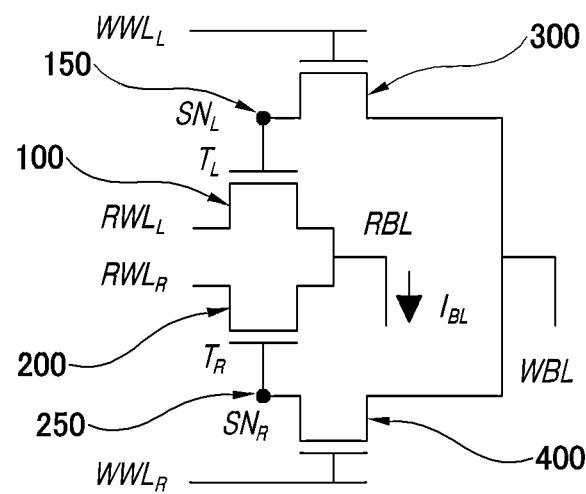
FIG. 1 is a diagram illustrating a random access memory according to an embodiment.

Hereinafter, embodiments of the present disclosure will be described in detail such that those skilled in the art to which the present disclosure belongs may easily implement the present disclosure with reference to the accompanying drawings. However, the present disclosure may be implemented in many different forms and is not limited to the embodiments to be described herein. In addition, in order to clearly describe the present disclosure with reference to the drawings, portions irrelevant to the description are omitted, and similar reference numerals are attached to similar portions throughout the specification.

When it is described that a portion is "connected" to another portion throughout the specification, this includes not only a case where the portion is "directly connected" to another portion but also a case where the portion is "indirectly connected" to another portion with another component therebetween. Also, when it is described that a portion "includes" a certain component, this means that the portion may further include another component without excluding another component unless otherwise stated.

Throughout the specification of the present application, when a member is described to be located on another member, this includes not only a case where a member is in contact with another member, but also a case where another member exists between the two members.

Hereinafter, preferred embodiments of the present disclosure will be described in detail with reference to the accompanying drawings and the following description. However, the present disclosure is not limited to the embodiments described herein and may be embodied in other forms. Like reference numerals refer to like elements throughout the specification.

Figure 2:
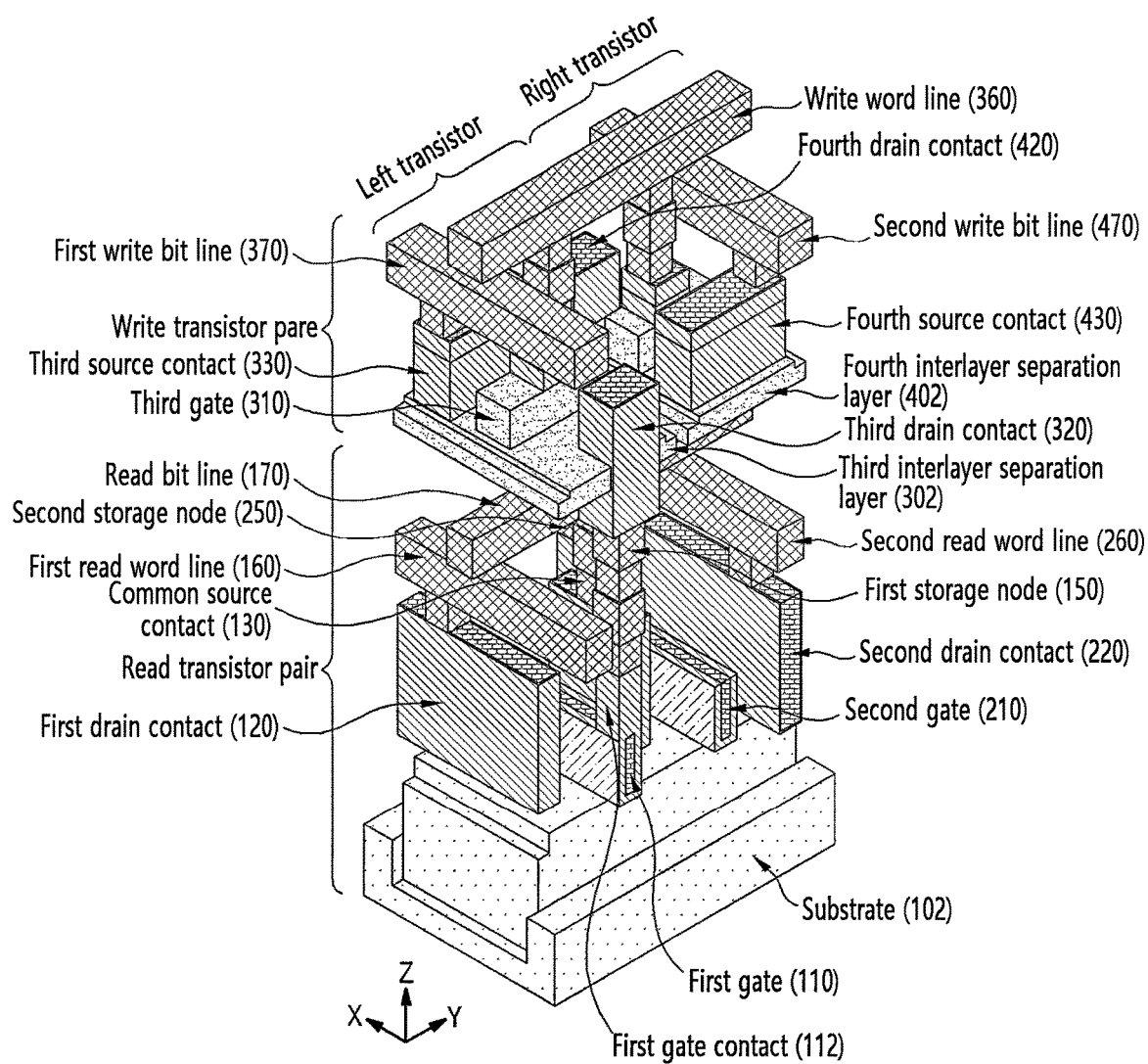
FIG. 2 illustrates a three-dimensional structure of a unit cell of the random access memory according to the embodiment.
Figure 3:
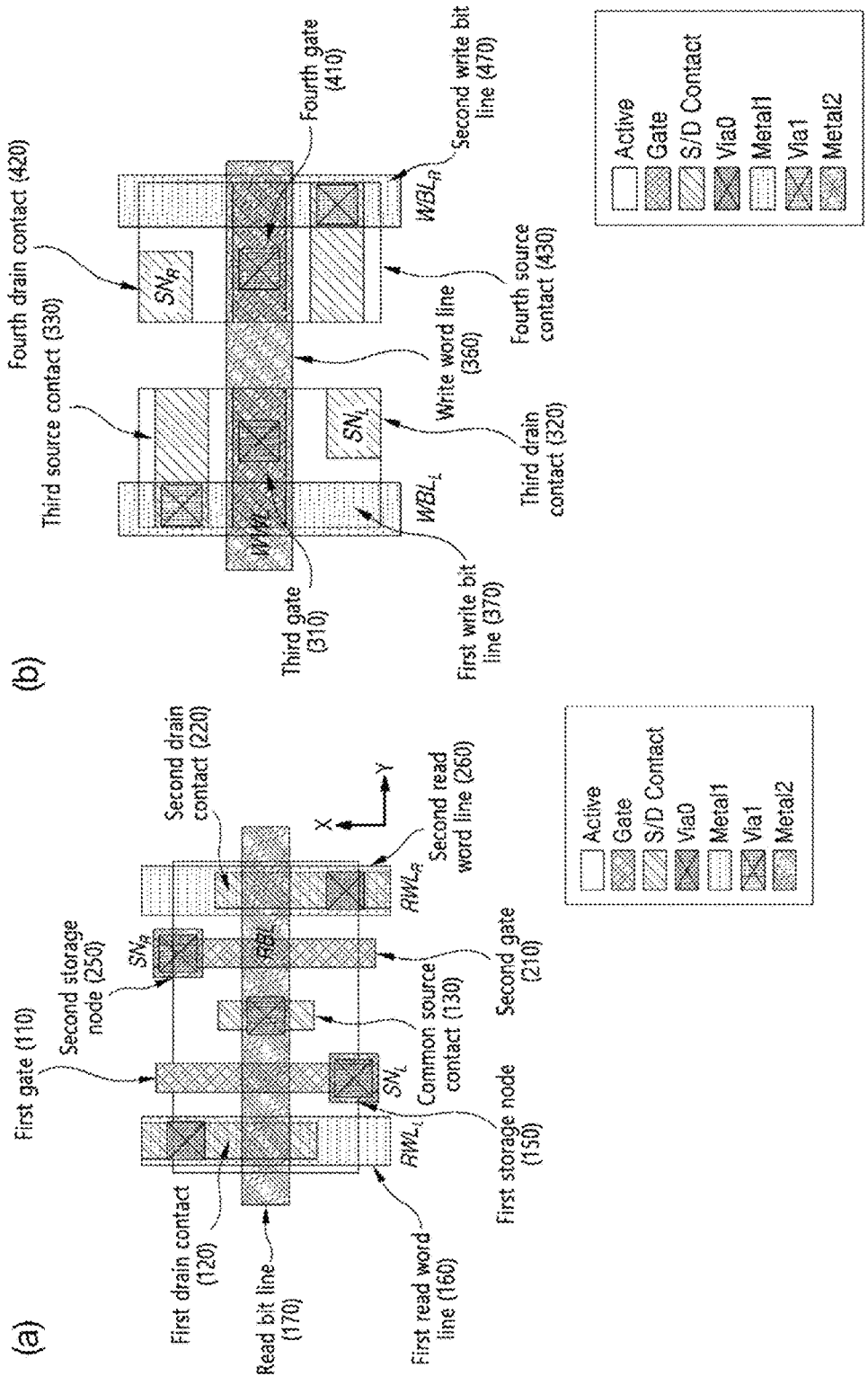
FIG. 3 illustrates cross-sectional structures of each transistor of the random access memory according to the embodiment.
Figure 4:
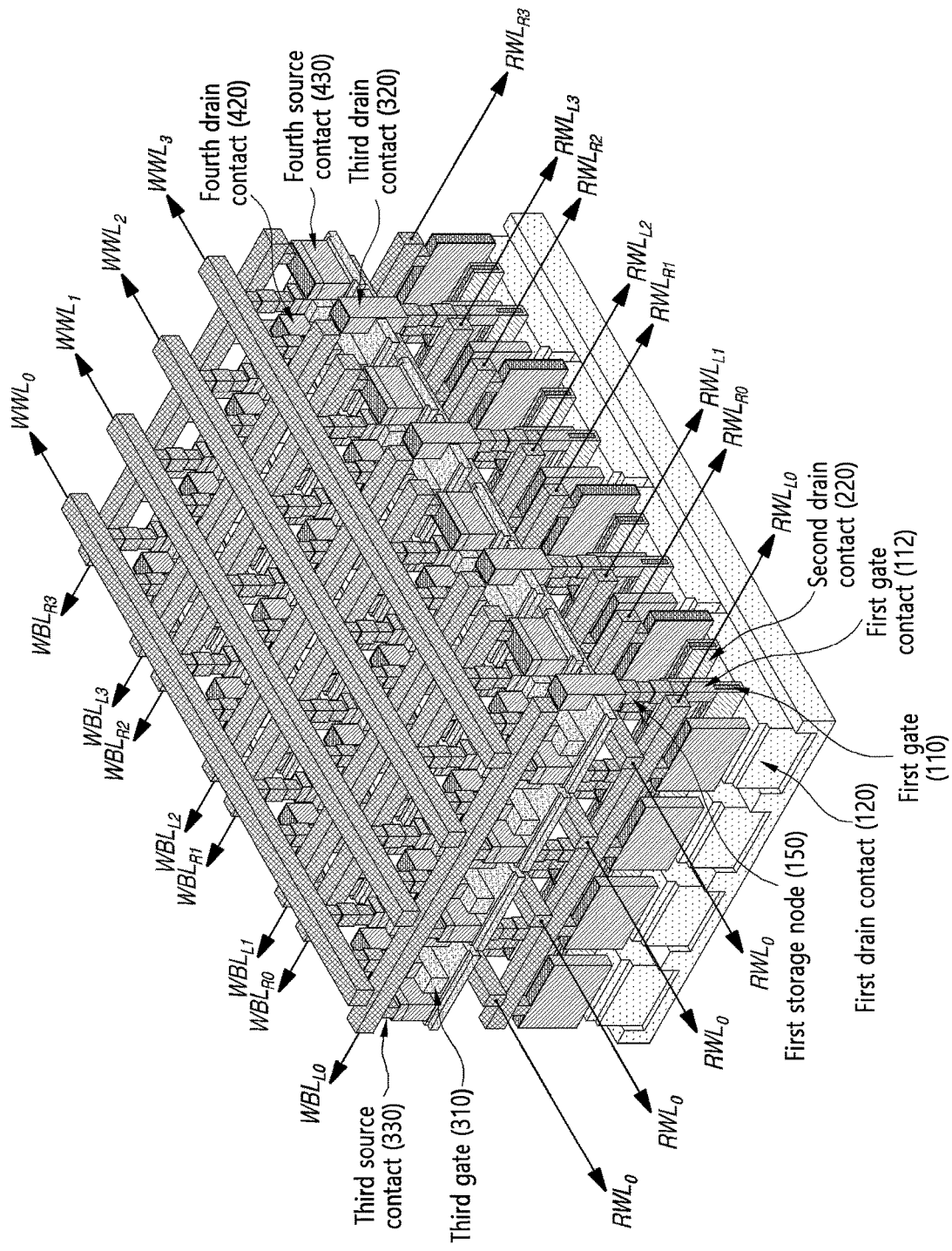
FIG. 4 illustrates random access memories arranged in an array according to an embodiment.
Figure 5:
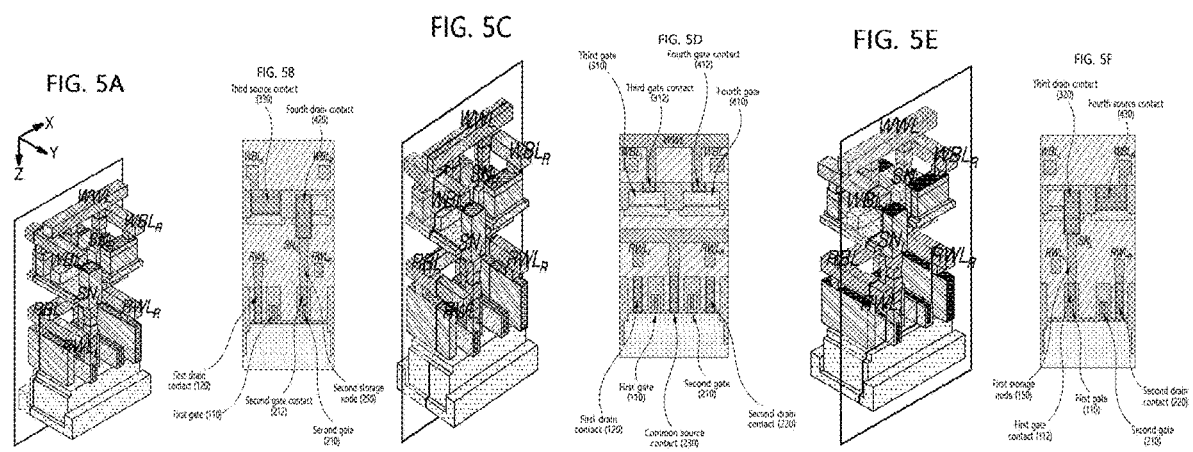
FIGS. 5 and 6 illustrate main cross-sections of the random access memory according to the embodiment.
Figure 6:
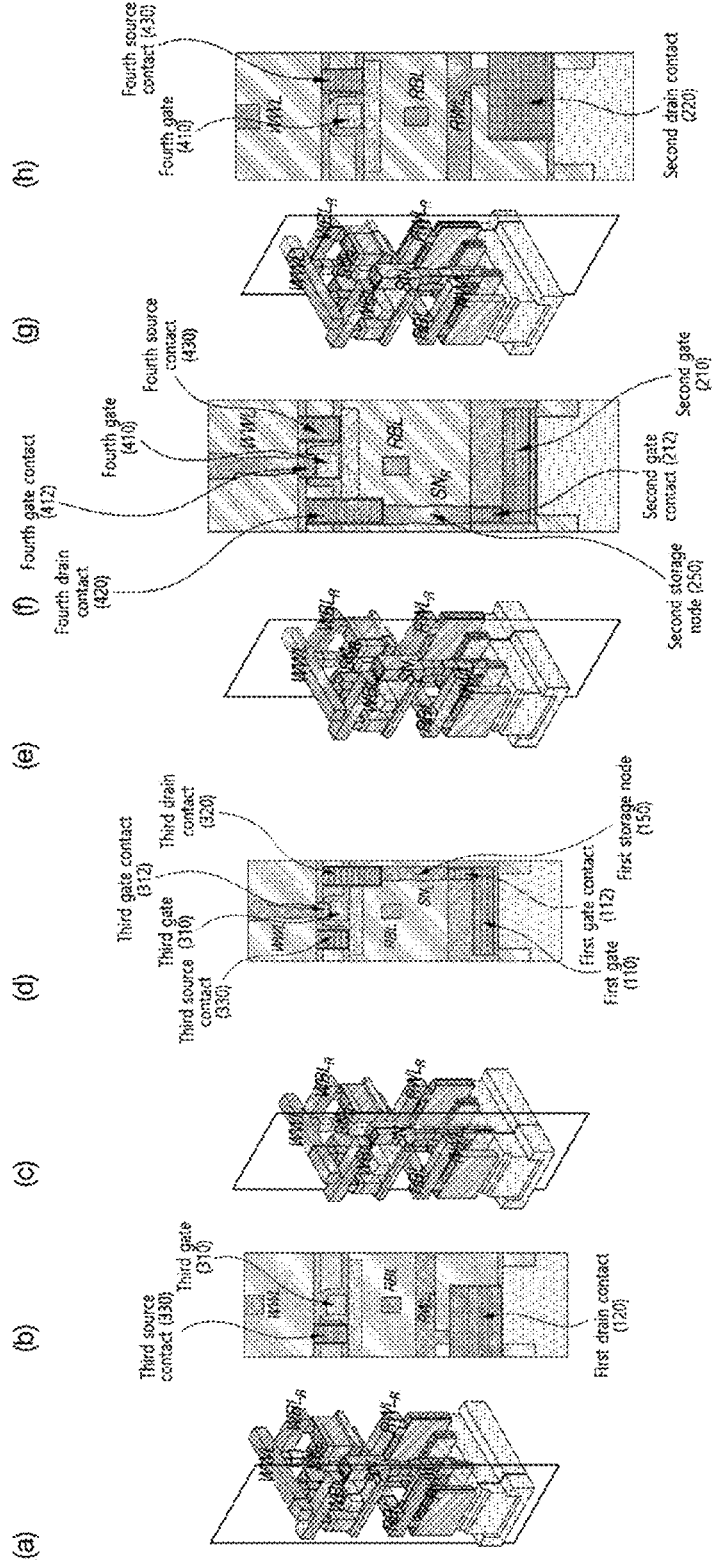

FIG. 1 is a diagram illustrating a random access memory according to an embodiment, FIG. 2 illustrates a three-dimensional structure of a unit cell of the random access memory according to the embodiment, and FIG. 3 illustrates cross-sectional structures of each transistor of the random access memory according to the embodiment. FIG. 4 illustrates random access memories arranged in an array according to an embodiment, and FIGS. 5 and 6 illustrate main cross-sections of the random access memory according to the embodiment.

As illustrated in FIG. 1, a random access memory 10 of the present disclosure includes a first transistor 100, a second transistor 200, a third transistor 300, a fourth transistor 400, a first storage node 150), and a second storage node 250. In this case, the first transistor 100 and the second transistor 200 have a pair relationship, the third transistor 300 and the fourth transistor 400 have a pair relationship, and the third transistor 300 and fourth transistor 400 are respectively and vertically stacked on the first transistor 100 and the second transistor 200. Also, the first transistor 100 and the third transistor 300 are arranged such that gates thereof are orthogonal to each other, and the second transistor 200 and the fourth transistor 400 are arranged such that gates thereof are orthogonal to each other. Also, the first transistor 100 and the second transistor 200 share a read bit line RBL, and the third transistor 300 and the fourth transistor 400 share a write bit line WBL.

The first transistor 100 includes a first gate 110 extending in a first direction. In addition, the second transistor 200 is disposed on the same plane as the first transistor and includes a second gate 210 extending in the first direction. The third transistor 300 includes a third gate 310 extending in a second direction perpendicular to the first direction and is stacked on the first transistor 100. The fourth transistor 400 includes a fourth gate 410 extending in the second direction and is stacked on the second transistor 200. The first storage node 150 connects the first gate 110 of the first transistor 100 to a drain of the third transistor 300 and stores data. The second storage node 250 connects the second gate 210 of the second transistor 200 to a drain of the fourth transistor 400 and stores data.

In addition, the first transistor 100 operates as a read transistor for reading a state of the first storage node 150, and the second transistor 100 operates as a read transistor for reading a state of the second storage node 250. Also, the third transistor 300 operates as a write transistor for writing data to the first storage node 150, and the fourth transistor 400 operates as a write transistor for writing data to the second storage node 250.

As such, the random access memory 10 of the present disclosure has a 4T0C structure that includes four transistors but does not include a separate capacitor. In addition, respective transistors may each be a field effect transistor (FET) including a gate, a drain, and a source.

It is also possible to implement a memory cell by placing four different transistors on the same plane and then connecting the four different transistors to each other, but in this case, areas for four transistors have to be provided, which reduces the degree of integration. Also, even when two transistors are stacked, a gate of one transistor needs to be connected to a drain of the other transistor, and thus, additional area is essentially required. However, as in the present disclosure, when the first transistor 100 and the third transistor 300 are arranged orthogonally, a 4T0C memory cell structure may be implemented while using an area for two transistors.

Also, an additional function may be performed by performing a complementary write operation to the first storage node 150 and the second storage node 250. For example, an XNOR function may be performed, and thus, the random access memory 10 may be appropriately applied to a binary neural network (BNN) or content addressable memory (CAM), and may also be applied to an analog computing-in-memory (CiM) accelerator. Accordingly, a bottleneck problem that occurs in a computing scheme of a von Neumann architecture may be resolved.

Referring to FIG. 2, the first transistor 100 includes a first gate 110 extending in a first direction (for example, an X-axis direction) on a substrate 102, a first drain and a first drain contact 120 formed on one side of the first gate 110 in parallel with the first gate 110, and a common source and a common source contact 130 formed on the other side of the first gate 110 in parallel with the first gate 110. The common source and the common source contact 130 are shared respectively as a source and a source contact in the first transistor 100 and the second transistor 200. Also, a first gate contact 112 is coupled to an upper portion of the first gate 110 and is connected to the first storage node 150. The first storage node 150 connects the first gate contact 112 to a drain of the third transistor 300 in a straight line. Also, the first drain contact 120 is connected to a first read word line $RWL_L$ or 160 extending in the first direction, and the common source contact 130 is connected to a read bit line RBL or 170 extending in the second direction (for example, a Y-axis direction).

The second transistor 200 has a pair relationship with the first transistor 100, and a detained configuration thereof is almost identical to a configuration of the first transistor 100. The second transistor 200 includes a second gate 210 extending in the first direction on the substrate 102, a second drain and a second drain contact 220 formed on one side of the second gate 210 in parallel to the second gate 210, and a common source and a common source contact 130 formed on the other side of the second gate 210 in parallel with the second gate 210. Also, a second gate contact 212 is coupled to an upper portion of the second gate 210 and is connected to the second storage node 250. The second storage node 250 connects the second gate contact 212 to a drain of the fourth transistor 400 in a straight line. Also, the second drain contact 220 is connected to a second read word line $RWL_R$ or 260 extending in the first direction.

As illustrated in FIG. 3A, because the first transistor 100 and the second transistor 200 share a common source, an insulation region is reduced by half compared to a case where the first transistor 100 and the second transistor 200 include sources, and accordingly, an increase in density of about 1.5 times in the Y-axis direction may be expected. Also, the first storage node 150 and the second storage node 250 are arranged diagonally with respect to a common source to obtain a sufficient process margin, and accordingly, a manufacturing yield may be increased.

The third transistor 300 includes a third interlayer separation layer 302 stacked on the transistor 100, a third gate 310 formed on the third interlayer separation layer 302 in a shape extending in the second direction, a third drain and a third drain contact 320 formed on one side of the third gate 310, and a third source and a third source contact 330 formed on the other side of the third gate 310. Also, a third gate contact 312 is coupled to an upper portion of the third gate 310. In addition, the third gate contact 312 is connected to a write word line WWL 360 extending in the second direction, and the third source contact 330 is connected to a first write bit line $WBL_L$ or 370 extending in the first direction.

The fourth transistor 400 has a pair relationship with the third transistor 300, and a detailed configuration thereof is almost identical to a configuration of the third transistor 300. The fourth transistor 400 includes a fourth interlayer separation layer 402 stacked on the second transistor 200, and a fourth gate 410 formed on the fourth interlayer separation layer 402 in a shape extending in the second direction. In this case, the fourth gate 410 is formed to be located on the same line as the third gate 310. Also, the fourth transistor 400 includes a fourth drain and a fourth drain contact 420 formed on one side of the fourth gate 410, and a fourth source and a fourth source contact 430 formed on the other side of the fourth gate 420. In this case, the fourth drain and the fourth drain contact 420 are formed to face the third source and the third source contact 330, and the fourth source and the fourth source contact 430 are formed to face the third drain and the third drain contact 320. That is, as illustrated in FIG. 3B, the third and fourth drains and the third and fourth sources are diagonally arranged. Also, the fourth gate contact 412 is coupled to an upper portion of the fourth gate 410. In addition, the fourth gate contact 412 is connected to the write word line WWL or 360 extending in the second direction, and the fourth source contact 430 is connected to a second write bit line $WBL_R$ or 470 extending in the first direction.

In this case, the first drain contact 120, the second drain contact 220, and the common source contact 130 are formed to have different heights, and the first read word line 160, the second read word line 260, and the read bit line RBL or 170 are at different heights while crossing each other so as not to overlap each other. Likewise, the third gate contact 312, the fourth gate contact 412, the third source contact 330, and the fourth source contact 430 are formed to have different heights, and the write word line 360, the first write bit line 370, and the second write bit line 470 are at different heights while crossing each other so as not to overlap each other.

Main cross sections are described with reference to FIGS. 5 and 6. FIG. 5B illustrates a cross-section perpendicular to a Y axis as illustrated in FIG. 5A, and in particular, illustrates a cross-section dividing the second gate 210 and the second storage node 250 along an X axis. FIG. 5D illustrates a cross-section perpendicular to the Y axis as illustrated in FIG. 5C, and in particular, illustrates a cross-section dividing the write word line WWL and the read bit line RBL along the X axis. FIG. 5F illustrates a cross-section perpendicular to the Y axis as illustrated in 5E, and in particular, illustrates a cross-section dividing the first gate 110 and the first storage node 150 along the X axis.

FIG. 6B illustrates a cross-section perpendicular to the X axis as illustrated in 6A, and in particular, illustrates a cross-section dividing the first drain contact 120 and the first read word line 160 along the Y axis. FIG. 6D illustrates a cross-section perpendicular to the X axis as illustrated in 6C, and in particular, illustrates a cross-section dividing the first gate 110 and the first storage node 150 along the Y axis. FIG. 6F illustrates a cross-section perpendicular to the X axis as illustrated in 6E, and in particular, illustrates a cross-section dividing the second gate 210 and the second storage node 250 along the Y axis. FIG. 6H illustrates a cross-section perpendicular to the X axis as illustrated in 6G, and in particular, illustrates a cross-section dividing the second drain contact 220 and the second read word line 260 along the Y axis.

As illustrated in FIG. 5B, it can be seen that the second storage node 250 is connected to the gate 210 of the second transistor 200 and a drain of the fourth transistor 400 in a straight line.

Also, as illustrated in FIG. 5D, it can be seen that the read bit line RBL is connected to a common source contact 230 of each cell. Also, it can be seen that the write word line WWL is connected to the third gate contact 312 and the fourth gate contact 412.

Also, as illustrated in FIG. 5F, it can be seen that the first storage node 150 is connected to the gate 110 of the first transistor 100 and a drain of the third transistor 300 in a straight line.

Also, as illustrated in FIG. 6B, it can be seen that the first read word line $RWL_L$ is connected to the first drain contact 120, and the third gate 310 of the third transistor 300 and the third source contact 330 are arranged to be adjacent to each other.

Also, as illustrated in FIGS. 6D and 6F, it can be seen that the third gate contact 312 of the third transistor 300 is connected to the write word line 360, and the fourth gate contact 412 of the fourth transistor 400 is connected to the write word line 360.

Also, as illustrated in FIG. 6D, it can be seen that the first storage node 150 is connected to the gate 110 of the first transistor 100 and a drain of the third transistor 300 in a straight line.

Also, as illustrated in FIG. 6F, it can be seen that the second storage node 250 is connected to the gate 210 of the second transistor 200 and a drain of the fourth transistor 400 in a straight line.

Also, as illustrated in FIG. 6H, it can be seen that the second read word line $RWL_R$ is connected to the second drain contact 220, and the fourth gate 410 of the fourth transistor 400 and the fourth source contact 430 are arranged to be adjacent to each other.

In addition, the first transistor 100 and the second transistor 200 arranged at a lower portion may be formed of single crystal silicon for a high-speed read operation. Also, the first transistor 100 and the second transistor 200 may be formed of a material with high mobility, such as carbon nanotubes, group III, or group V.

In addition, the third transistor 300 and the fourth transistor 400 arranged on an upper portion have gates that have to be deposited on an upper portion of the interlayer separator, thereby being also formed of polysilicon, low-temperature polysilicon (LTPS) or an indium gallium zinc oxide (IGZO) material which is used for formation of flash memory. In particular, when using a material with a high bandgap, such as IGZO, an off-current may be reduced by 10 to 100 times compared to low-temperature polysilicon, and thus, retention time may be increased.

In addition, the first transistor 100 and the second transistor 200 according to the embodiment may each be implemented in various forms, such as a planar device, a FinFET, a gate all around (GAA)-FET, a nanosheet (NS)-FET, a nanowire (NW)-FET, and a negative capacitance (NC)-FET. Also, the third transistor 300 and the fourth transistor 400 may each further reduce an off-current by being implemented as a device structure, such as a tunnel FET (TFET), a recess channel array transistor (RCAT), or a saddle fin.

In addition, lengths of the first gate 110 of the first transistor 100 and the second gate 210 of the second transistor 200 which are read transistors may be set independently of lengths of the third gate 210 of the third transistor 300 and the fourth gate 410 of the fourth transistor 400 which are write transistors. That is, the length of the first gate 110 and the length of the third gate 310 or the fourth gate 410 may be set to be equal to or different from each other. Also, the length of the second gate 210 and the length of the third gate 310 or the fourth gate 410 may be set to be equal to or different from each other.

In particular, the lengths of the first gate 110 and the second gate 210 used as read transistors may be designed to be short, and the lengths of the third gate 310 and the fourth gate 410 used as write transistors may be designed to be long. When an orthogonal structure is not adopted, the lengths of respective gates have to be designed to be equal to each other, but as in the present disclosure, by using a structure in which two transistors stacked perpendicularly to each other are orthogonal to each other, lengths of gates of respective transistors may be designed to be different from each other. In this case, when necessary, the lengths of the first gate 110 and the second gate 210 arranged in an upper portion may be set differently, and the lengths of the third gate 310 and the fourth gate 410 arranged in an upper portion may also be set differently.

Also, because the read transistor and the write transistor are in different layers, memory data may be freely arranged. Because word lines and bit lines are formed for each transistor, when transposition for data is necessary during manufacturing of a memory array, and when designing by transposing only the routing of the write word line WWL of a write transistor and the read word line RWL of the read transistor in a state where a direction of a cell's transistor is fixed, the transposition for data may be performed efficiently.

According to the structure of the present disclosure, a cell operation may also be improved. Compared to the DRAM having a conventional structure, an operation speed is further increased, and retention time increases, and thus, an energy-efficient and high-speed operation may be performed. In particular, the retention time may be calculated by dividing capacitance of a storage node by an off-current. Therefore, the retention time may be increased by increasing the capacitance of the storage node or reducing the off-current.

In order to increase the capacitance of a storage node, the capacitance of a drain of the third transistor 300 or a drain of the fourth transistor 400 needs to be increased, a design may be applied to enable a distance between the third gate 310 and the third drain contact 320 to be closer to a distance between the fourth gate 410 and the fourth drain contact 420, or to optimize a material to increase a dielectric constant of a thin film, or to increase an area between the third gate 310 and the third drain contact 320 and an area between the fourth gate 410 and the fourth drain contact 320.

Also, in order to reduce an off-current, low-temperature polysilicon (LTPS) or an IGZO material may be used as a channel material of the third transistor 300 or the fourth transistor 400, asymmetric Junction may be implemented by reducing the overlap between a source and a gate, or a device structure, such as a TFET, an RCAT, and saddle fin may be adopted.

Hereinafter, a method of manufacturing a random access memory is described.

Figure 7:
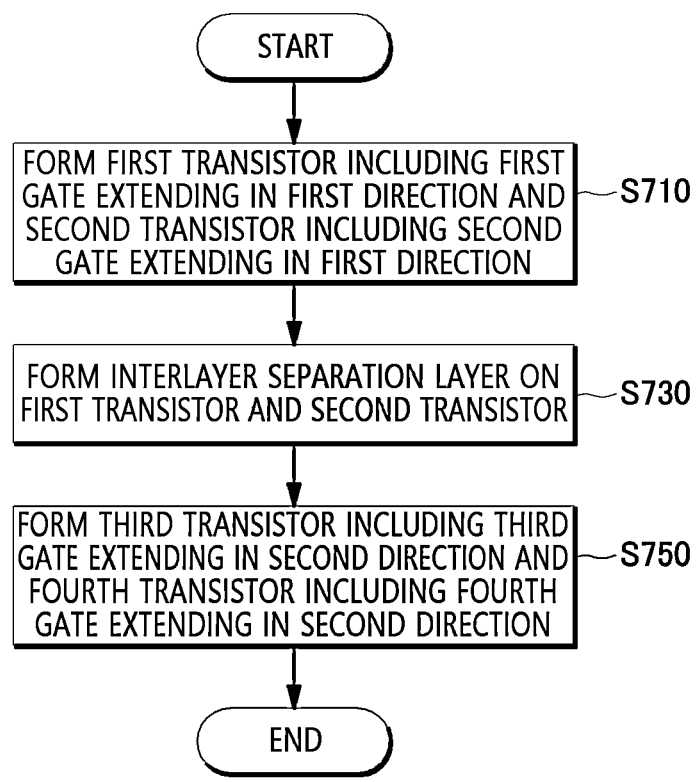
FIG. 7 is a flowchart illustrating a method of manufacturing a random access memory, according to an embodiment.
Figure 8:
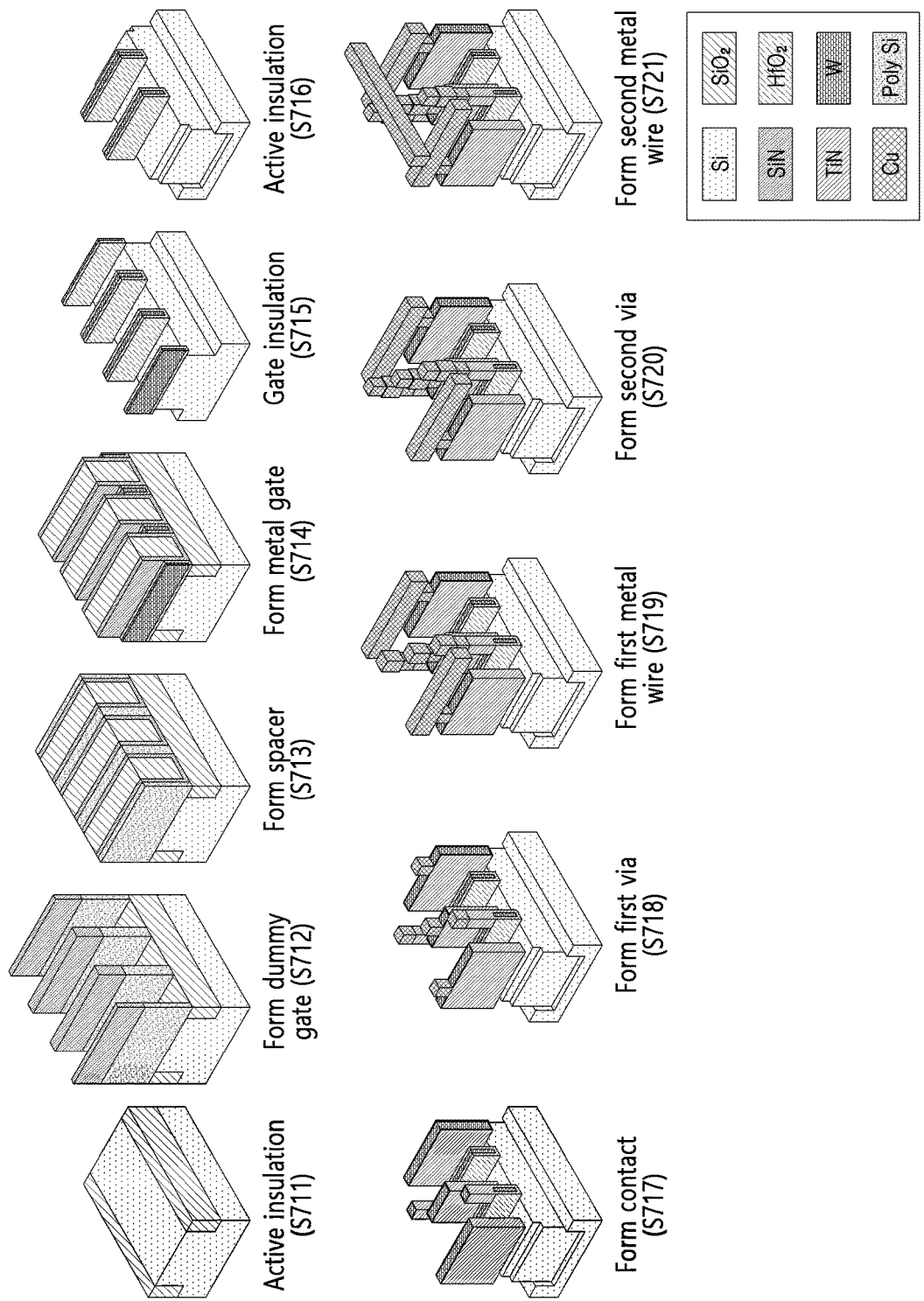
FIGS. 8 and 9 are views illustrating the method of manufacturing the random access memory, according to the embodiment.
Figure 9:
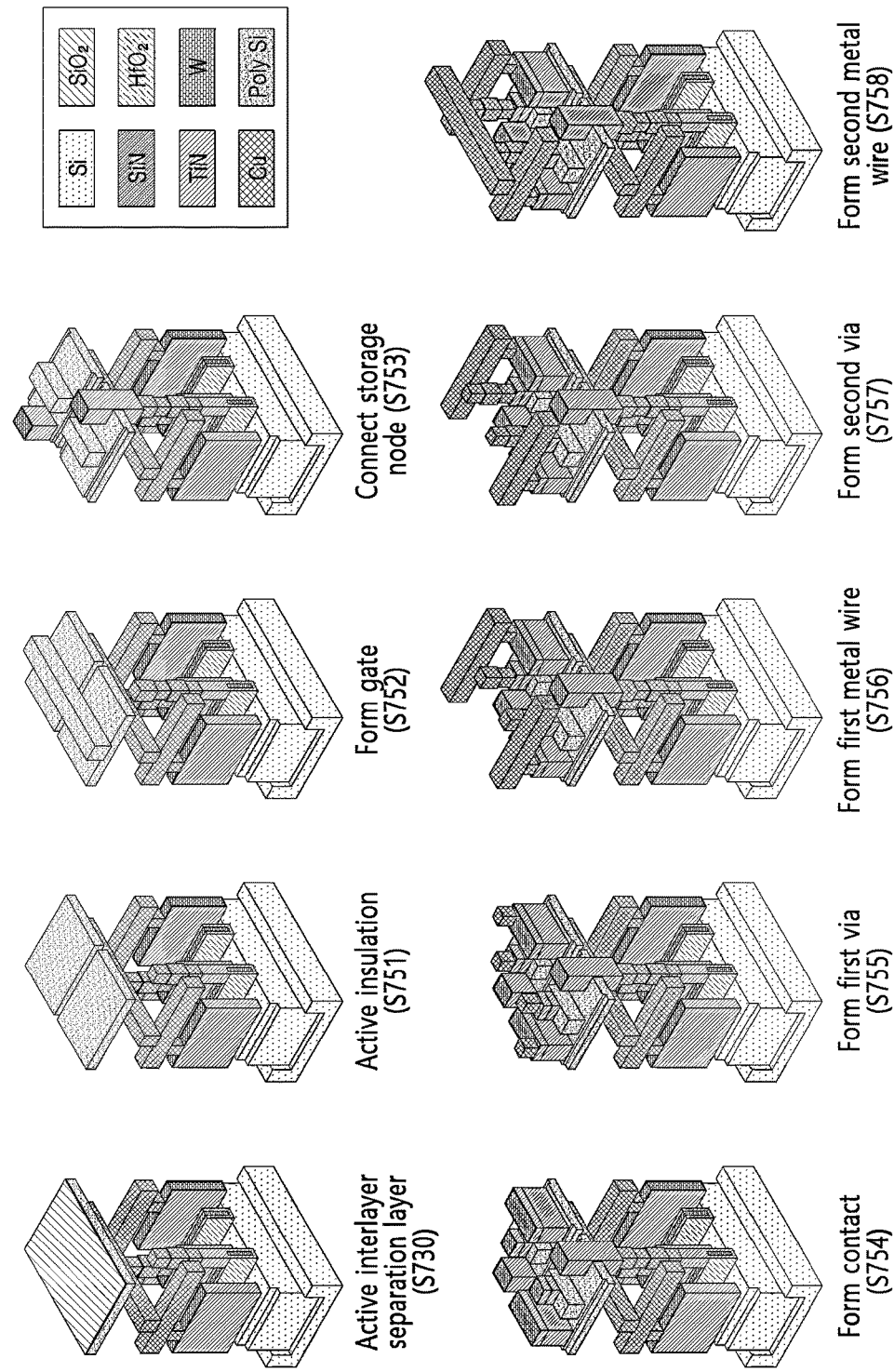

FIG. 7 is a flowchart illustrating the method of manufacturing the random access memory, according to an embodiment, and FIGS. 8 and 9 are views illustrating the method of manufacturing the random access memory, according to the embodiment.

First, the first transistor 100 including the first gate 110 extending in the first direction and the second transistor 200 including the second gate 210 extending in the first direction are formed on the same plane (S710).

Referring to FIG. 8 for a detailed process, an active region for forming a transistor on a substrate is formed and the active region is divided for each unit cell (S711), dummy gates are formed on the active region (S712), a spacer is formed between the dummy gates, and a planarization process is performed (S713), the dummy gates are removed, metal gates are formed in spaces from which the dummy gates are removed, and the spacer is removed (S714). In this case, atomic layer deposition may be used to form the spacer, and the spacer may be formed of a material, such as SiON, SiOCN, or SiOC. Also, a metal gate process may form $SiO_2$ and deposit a high dielectric material, such as $HfO_2$, through an interlayer (IL) process. Additionally, for work function engineering, a material, such as $Al_2O_3$ or $La_2O_3$, may be stacked as a stacked structure. Also, TiN, Al, TiAlC, TiAl, W, or so on may be used as a material for a metal gate. In addition, the metal gate extends in the first direction.

Next, the gate 110 is insulated (S715), a gate region is opened and etched, and after etching, an insulating material is deposited, and in this case, SiN may generally be used as the insulating material. Thereafter, a single diffusion break (SDB) process may be used to electrically insulate a source and a drain of a single cell. In this process, an adjacent gate between cells are etched and filled with an insulator.

Thereafter, the active region is insulated (S716), contacts connected to upper portions of a gate and a source are formed (S717), vias are formed (S718), wires for a read word lines are formed (S719), vias are formed (S720), and wires for read bit lines are formed (S721). In this case, various contact techniques, such as a self-aligned contact and a direct patterned contact, may be applied. In addition, a backend-of-line (BEOL) process for a transistor is performed in the order of a first via, a first metal wire, a second via, and a second metal wire, and metal wires are orthogonal to form two layers. In this case, both a single damascene process and a dual damascene process may be applied. The metal material is generally Cu, and an electro plate process is used therefor, and Ru, Ti, and TiN may be applied to Cu liner.

In this case, in the process of forming metal wires and vias (S718 to S721), a metal layer is formed together on an upper portion of the first gate contact 112 such that the first storage node 150 is formed together, and another metal layer is formed together on an upper portion of the second gate contact 212 such that the second storage node 250 is formed together. As illustrated, it can be seen that heights of the first storage node 150 and the second storage node 250 are equal to a height of a read bit line. In addition, the storage node 150 is formed of a metal wire, and Ti, TiN, Ni, Mo, Ru, Cu, W, or so on may be used for the metal wire.

Next, the interlayer separation layers 302 and 402 are respectively formed on the first transistor 100 and the second transistor 200 (S730).

The interlayer separation layers 302 and 402 are used as substrates for distinguish vertical regions of the first transistor 100, the second transistor 200, the third transistor 300, and the fourth transistor 400 and also for forming the third transistor 300 and the fourth transistor 400. In this case, the interlayer separation layer 302 functions as a channel material of the third transistor 300, the interlayer separation layer 402 functions as a channel material of the fourth transistor 400, and the interlayer separation layers 302 and 402 may each be formed of IGZO, LTPS, or so on.

Next, the third transistor 300 including the third gate 310 extending in the second direction perpendicular to the first direction is formed on the same plane as the fourth transistor 400 including the fourth gate 410 extending in the second direction (S750). In this case, the forming of the third transistor 300 and the fourth transistor 400 (S750) includes forming the third gate 310 and the fourth gate 410 extending in the second direction on the interlayer separation layer 402.

In addition, during the forming S710 and S750, the first storage node 150 that connects the first gate 110 of the first transistor 100 to a drain of the third transistor 300 is formed, and the second storage node 250 that connects the gate 210 of the second transistor 200 to a drain of the fourth transistor 400.

Referring to FIG. 8 for a detailed process, insulating an active region for forming the second transistor 200 on an interlayer separation layer is formed (S751), and a gate is formed in the active region, and gate passivation is formed in the active region (S752). Then, the third gate 310 and the fourth gate 410 are formed by etching the gate and a central portion of the interlayer separation layer, and therethrough, the third gate 310 and the fourth gate 410 are arranged along the same line. Then, a third drain and a fourth drain are formed, the third drain is connected to the first storage node 150, and the fourth drain is connected to the second storage node 250 (S753). A part of the first storage node 150 is formed in the process of forming the first transistor 100, and the first storage node 150 is completed through an additional process. Also, a portion of the second storage node 250 is formed in the process of forming the second transistor 200, and the second storage node 250 is completed through an additional process. In the previous processes S718 to S721, the first storage node 150 and the second storage node 250 are formed to have heights equal to a height of a second metal wire, and a process is performed in which the second metal wire is connected to a drain of and the third transistor 300 and the second metal wire is connected to a drain of the fourth transistor 400. To this end, a process of etching the interlayer separation layer and depositing a contact material is performed so as to correspond to each area of the first storage node 150 and the second storage node 250, and the contact material includes Ti, TiN, W, Ru, or so on.

Next, contacts respectively connected to a drain, a gate, and a source are formed (S754), a first via is formed (S754), wires for the first write bit line 370 and the second write bit line 470 are formed (S756), a second via is formed (S757), and a wire for the write word line 360 is formed (S758).

Figure 10:
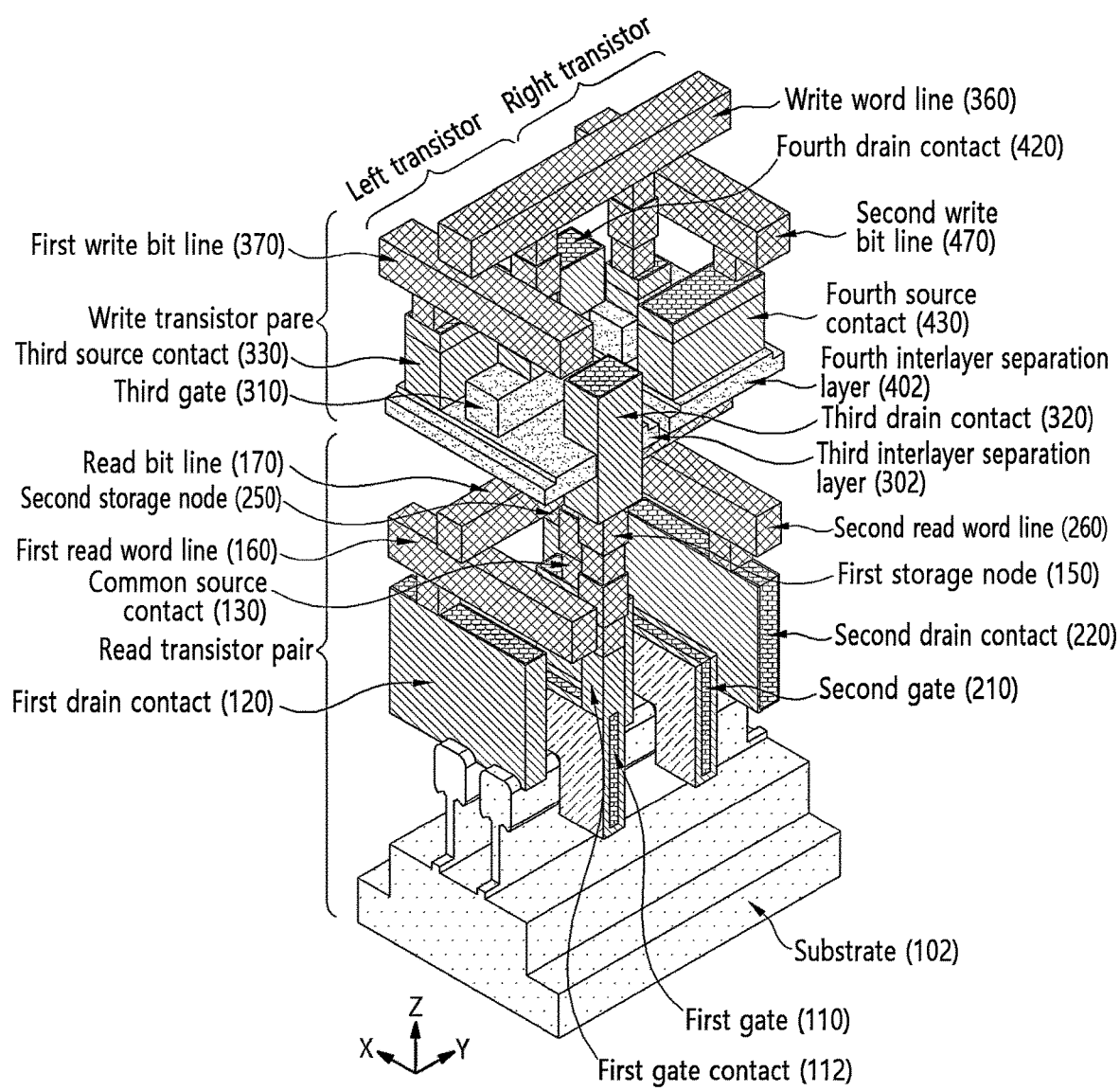
FIG. 10 is a view illustrating a random access memory according to another embodiment.

FIG. 10 illustrates a detailed configuration of a random access memory according to another embodiment.

FIG. 10 illustrates that a first transistor 100 and a second transistor are each configured as a FinFET, and the other configurations are the same as the configurations described above with reference to FIGS. 2 to 6. That is, the first transistor 100 and the second transistor 200 are stacked respectively and orthogonally to a third transistor 300 and a fourth transistor 400, and a first storage node 150 connecting a gate 110 of the first transistor 100 to a drain of the third transistor 300 is provided, and a second storage node 250 connecting a gate 210 of the second transistor 200 to a drain of the fourth transistor 400 is provided.

The present disclosure provides a memory cell structure in which transistors are stacked in an orthogonal direction by combining complementary metal oxide semiconductor (CMOS) technology and memory semiconductor technology. The present disclosure may be applied to CAM and CiM fields in addition to memory cells.

The above descriptions of the present disclosure are for illustrative purposes only, and those skilled in the art to which the present disclosure belongs will understand that the present disclosure may be easily modified into another specific form without changing the technical idea or essential features of the present disclosure. Therefore, the embodiments described above should be understood as illustrative in all respects and not limiting. For example, each component described as a single type may be implemented in a distributed manner, and similarly, components described in a distributed manner may also be implemented in a combined form.

The scope of the present disclosure is indicated by the following claims rather than the detailed description above, and the meaning and scope of the claims and all changes or modifications derived from the equivalent concepts should be interpreted as being included in the scope of the present disclosure.

BRIEF DESCRIPTION OF THE SIGNS

10: random access memory
100: first transistor
110: first gate
110: first gate

120: first drain contact
130: common source contact
150: first storage node
160: first read word line
170: read bit line
200: second transistor
210: second gate
220: second drain contact
230: second source contact
250: second storage node
260: second write word line
300: third transistor
310: third gate
320: third drain contact
330: third source contact
350: third storage node
360: write word line
370: first write bit line
400: fourth transistor
410: fourth gate
420: fourth drain contact
430: fourth source contact
470: second write bit line

What is claimed is:

1. A random access memory comprising:
a first transistor including a first gate extending in a first direction;
a second transistor disposed on a same plane as the first transistor and including a second gate extending in the first direction;
a third transistor including a third gate extending in a second direction perpendicular to the first direction and formed on the first transistor;
a fourth transistor including a fourth gate extending in the second direction and formed on the second transistor;
a first storage node connecting the first gate of the first transistor to a drain of the third transistor and storing data; and
a second storage node connecting the second gate of the second transistor to a drain of the fourth transistor and storing data.

2. The random access memory of claim 1, wherein
the first transistor operates as a read transistor for reading a state of the first storage node,
the second transistor operates as a read transistor for reading a state of the second storage node,
the third transistor operates as a write transistor for writing data to the first storage node, and
the fourth transistor operates as a write transistor for writing data to the second storage node.

3. The random access memory of claim 1, wherein
the first transistor and the second transistor share a source and a source contact.

4. The random access memory of claim 1, wherein
each of the first gate and the second gate is formed of single crystal silicon, and
each of the third gate and the fourth gate is formed of one of polysilicon, low-temperature polysilicon, or an indium gallium zinc oxide (IGZO) material.

5. The random access memory of claim 1, wherein
the first transistor includes a first drain contact formed on one side of the first gate in parallel to the first gate, a first gate contact formed on the first gate, and the first storage node connecting the first gate contact to the drain of the third transistor in a straight line,
the second transistor includes a second drain contact formed on one side of the second gate in parallel to the second gate, a second gate contact formed on the second gate, and the second storage node connecting the second gate contact to the drain of the fourth transistor in a straight line,
the first transistor and the second transistor include a common source and a common source contact between the first gate and the second gate,
the first drain contact is connected to a first read word line extending in the first direction,
the second drain contact is connected to a second read word line extending in the first direction, and
the common source contact is connected to a read bit line extending in the second direction.

6. The random access memory of claim 5, wherein
the third transistor includes an interlayer separation layer stacked on the first transistor, the third gate formed on the interlayer separation layer, a third drain contact formed on one side of the third gate, and a third source contact formed on the other side of the third gate,
the fourth transistor includes the fourth gate formed on the interlayer separation layer and on a same line as the third gate, a fourth source contact formed on one side of the fourth gate to face the third drain contact, and a fourth drain contact formed on the other side of the fourth gate to face the third source contact,
a contact of the third gate and a contact of the fourth gate are connected to a write word line extending in the second direction,
the third source contact is connected to a first write bit line extending in the first direction, and
the fourth source contact is connected to a second write bit line extending in the first direction.

7. The random access memory of claim 6, wherein
a height of the first drain contact, a height of the second drain contact, and a height of the common source contact are different from each other, and the first read word line, the second read word line, and the read bit line do not overlap each other, and
a height of the contact of the third gate, a height of the contact of the fourth gate, a height of the third source contact, and a height of the fourth source contact are different from each other, and the write word line, the first write bit line, and the second write bit line do not overlap each other.

8. The random access memory of claim 1, wherein
a length of the first gate, a length of the second gate, a length of the third gate, and a length of the fourth gate are set independently of each other.

9. The random access memory of claim 1, wherein
each of the first transistor and the second transistor is implemented as any one of a planar field effect transistor planar FET), a FinFET, a gate all around (GAA)-FET, a nanosheet (NS)-FET, a nanowire (NW)-FET, or a negative capacitance (NC)-FET, and
each of the third transistor and the fourth transistor is implemented as any one of a tunnel FET (TFET), a recess channel array transistor (RCAT), or a saddle fin.

10. A method of fabricating a random access memory, the method comprising:
forming, on a same plane, a first transistor including a first gate extending in a first direction and a second transistor including a second gate extending in the first direction;
forming an interlayer separation layer on the first transistor and the second transistor; and
forming, on the interlayer separation layer, a third transistor including a third gate extending in a second direction perpendicular to the first direction and forming a fourth transistor including a fourth gate extending in the second direction, in which the third transistor and the fourth transistor are formed on a same plane, wherein throughout the forming of the first transistor and the second transistor and the forming of the third transistor and the fourth transistor includes forming a first storage node connecting the first gate of the first transistor to a drain of the third transistor, and a second storage node connecting the second gate of the second transistor to a drain of the fourth transistor.

11. The method of claim 10, wherein the forming of the first transistor and the second transistor includes forming a first drain contact on one side of the first gate in parallel to the first gate, a first gate contact on the first gate, a second drain contact on one side of the second gate in parallel to the second gate, a second gate contact on the second gate, and a common source contact between the first gate and the second gate and shared by the first transistor and the second transistor; and forming a first read word line connected to the first drain contact, a second read word line connected to the second drain contact, a read bit line connected to the common source contact, a first storage node connected to an upper portion of the first gate contact, and a second storage node connected to an upper portion of the second gate contact, and when forming the first read word line, the second read word line, and the read bit line, the first storage node is sequentially stacked on the first gate contact, and the second storage node is sequentially stacked on the second gate contact.

12. The method of claim 10, wherein the forming of the third transistor and the fourth transistor includes forming a third drain on one side of the third gate, a third source contact on the other side of the third gate, a third gate contact above the third gate, a fourth drain on one side of the fourth gate, a fourth source contact on the other side of the fourth gate, and a fourth gate contact above the fourth gate, the third drain is connected to the first storage node when the third drain is formed, and the fourth drain is connected to the second storage node when the fourth drain is formed.

13. The method of claim 12, wherein the forming of the third transistor and the fourth transistor further includes forming a write word line connected to the third gate contact and the fourth gate contact, a first write bit line connected to the third source contact, and a second write bit line connected to the fourth source contact.

* * * * *